Nov. 5, 1935.  D. R. BAILEY  2,020,013
GRADING APPARATUS
Filed Nov. 15, 1932  2 Sheets-Sheet 1
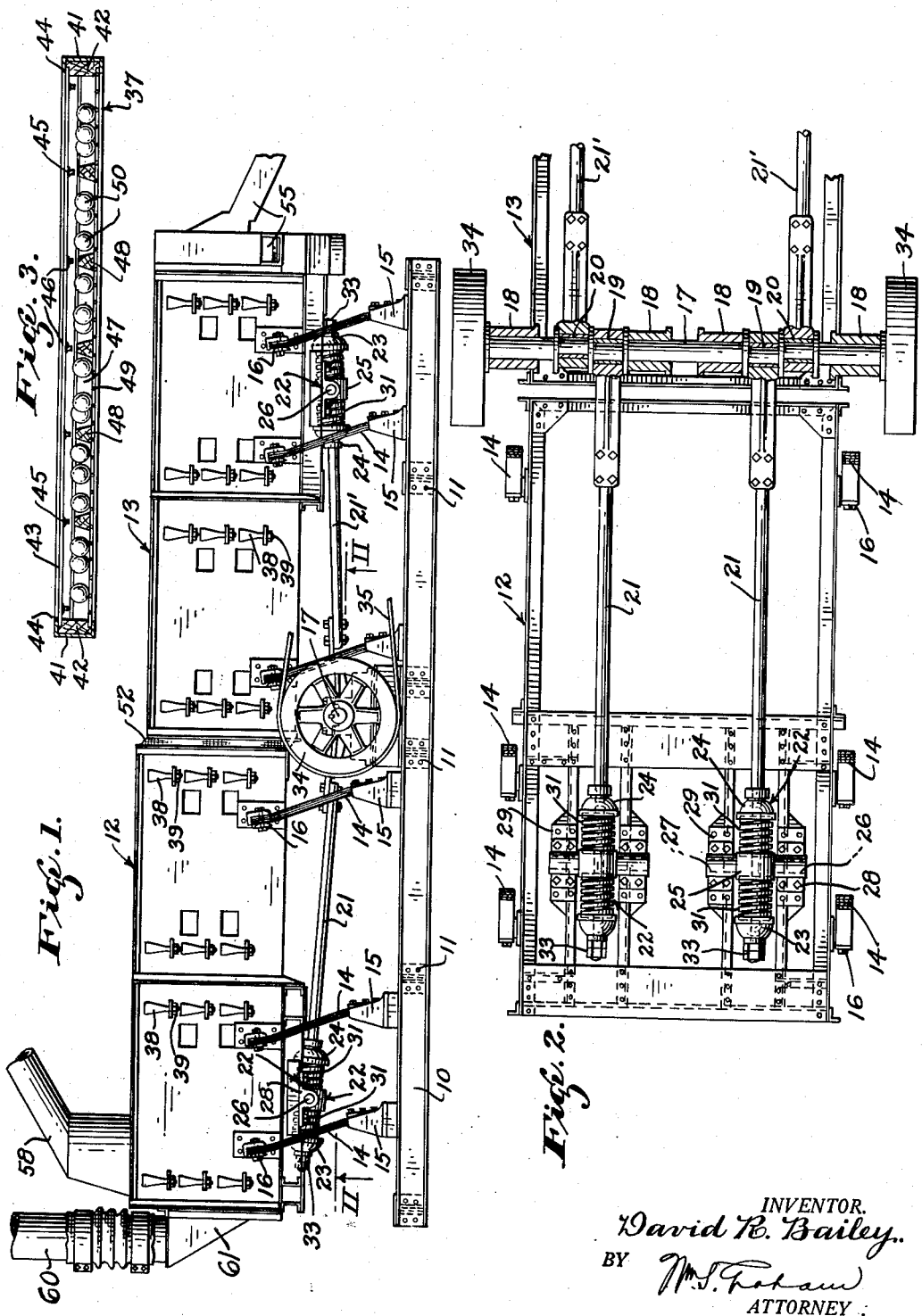
INVENTOR.
David R. Bailey
BY
ATTORNEY.

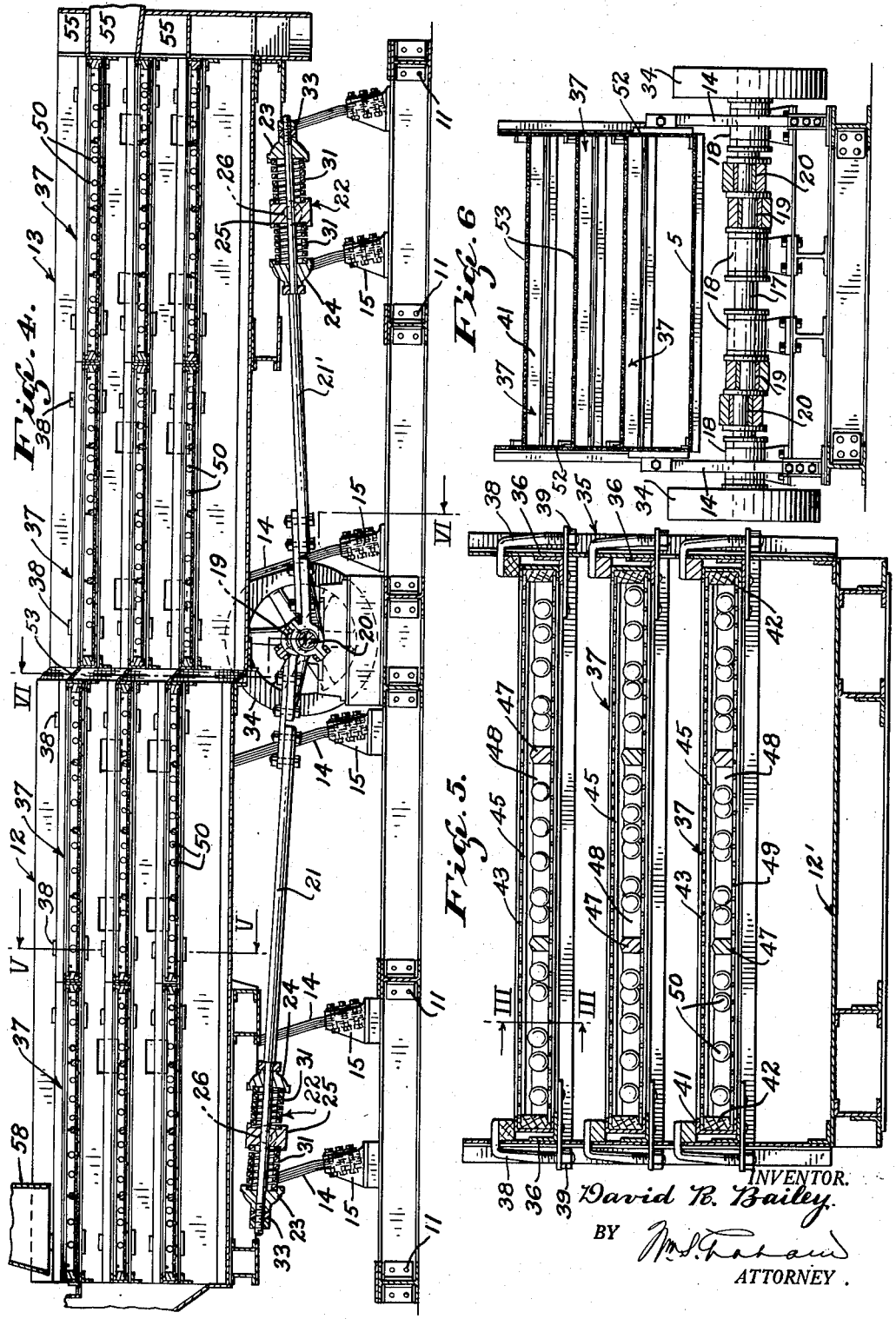

Patented Nov. 5, 1935

2,020,013

UNITED STATES PATENT OFFICE 2,020,013

GRADING APPARATUS

David R. Bailey, Sacramento, Calif., assignor to California Almond Growers Exchange, San Francisco, Calif., a corporation of California Application November 15, 1932, Serial No. 642,731

3 Claims. (Cl. 209—311)

This invention relates to a nut grading apparatus, and more particularly to a production grader for the grading of large quantities of nuts, such as almonds, pecans, peanuts and the like.

It is one object of this invention to provide an improved apparatus for grading nuts in large quantities.

Another object is to provide in a grading apparatus, novel means, that shall separate nuts according to size and separately deliver the several sizes to different bins.

Another object is to provide in an apparatus for grading batches of individual miscellaneous sized nuts, wherein means is provided for grading such product as to size, that shall separate said product in accordance with predetermined dimensions, and that shall be adaptable for selectively including any number of-sizes of such product in each of the several grades.

Another object is to provide in an apparatus for grading nuts, means for imparting novel movement to the different grading sections of the apparatus, and novel means for varying the movement of one section relatively to the other.

A further object is to provide in a grading apparatus having the above characteristics, a plurality of grading trays having novel means for preventing the clogging of the nuts being graded on said trays.

A further object is to provide a grading apparatus having the above characteristics, that shall be simple in structure, easy to operate, durable, efficient in operation, comparatively cheap to manufacture and inexpensive to maintain and operate.

The above and further objects will be made apparent throughout the further description of the invention, when taken in connection with the accompanying drawings wherein like reference characters refer to like parts. It is to be distinctly understood that the drawings are not a definition of the invention, but are merely one form of an apparatus for carrying out the invention; the scope of the invention being defined by the appended claims.

In the drawings:—

Fig. 1 is a side elevational view of an apparatus embodying the invention.

Fig. 2 is a bottom plan view, taken on the line II—II of Fig. 1.

Fig. 3 is a sectional view of a grading tray, taken on the line III—III of Fig. 5.

Fig. 4 is a longitudinal sectional view of Fig. 1.

Fig. 5 is a sectional view taken on the line V—V of Fig. 4, and

Fig. 6 is a sectional view taken on the line VI—VI of Fig. 4.

The invention comprises an elongated supporting base, a pair of grading sections supported by said base, novel means for supporting said sections, means for oscillating said sections in opposite directions, a plurality of novel grading trays associated with each of said sections, and novel means for actuating the apparatus.

In the form shown, the elongated supporting base may be constructed of a plurality of I-shaped metallic members 10, positioned to form a rigid structure, the cooperating I-shaped members 10 being connected one with the other by any suitable means, such as rivets or welding, as shown at 11. A pair of grading sections, represented in their entirety by 12 and 13, are supported above the base structure by means of a plurality of resilient supports 14. These supports 14 may be made up of laminated slats or spring members. The lower end of the members 14 are rigidly fixed to and supported by the base, as shown at 15. The upper end of the members 14 are fastened to the respective sides of the sections 12 and 13, as shown at 16. The normal position of the members 14 are inclined, as shown, for supporting the sections 12 and 13 in an off center position relative to the base during relative longitudinal movement of the sections 12 and 13 relative to the base. In other words, the sections 12 and 13 are moved to the right, as viewed in Fig. 1, the members 14 being off center will raise the elevation of the sections, and during the movement of the sections 12 and 13 toward the left, as viewed in Fig. 1, the elevation of said sections will be lowered, the purpose of which will be hereinafter described.

Novel means are provided for oscillating the sections 12 and 13 in opposite directions, which means comprises a power shaft 17 rotatably mounted transversely on the supporting base by suitable bearing structures 18. In the form shown, the shaft 17 is provided with two pairs of oppositely disposed eccentrics 19 and 20, the eccentric 19 being adapted to receive one end of an actuating shaft 21, the latter having its outer end connected to the lower framework of the section 12 by novel means, represented in its entirety by 22, which means will be later described. The eccentric 20 is adapted to receive one end of an oscillating shaft 21', the latter having its outer end connected to the lower framework of section 13 by novel means, represented in its entirety by 22'. As hereinafter described, the oppositely disposed eccentrics oscillate sections 12 and 13 relatively oppositely.

The connecting means 22 and 22' are similar in structure, and each comprises a pair of oppositely disposed cup shaped members 23 and 24 spaced apart. Each of the members 23 and 24 are provided with openings for receiving the corresponding shafts 21 and 21'. The shaft is provided with a ring member 25 disposed intermediate the cup shaped members 23 and 24, the ring member 25 being adapted for relative longitudinal movement with respect to its cooperating oscillating shaft. Each of the ring members 25 are provided with diametrically oppositely disposed stub shafts 26 and 27, the shafts 26 and 27 being pivotally mounted in brackets 28 and 29 respectively, the latter brackets being fixed to and carried by the lower framework of the respective sections 12 and 13.

Interposed between each of the cup shaped members 23 and 24 and the adjacent side of the ring member 25 is provided a spring member 31. These spring members 31 surround the oscillating shaft and respectively have one of their ends seated in the respective cup shaped members 23 and 24, and having their other end bearing against the cooperating face of the ring member 25.

Means 33, which may be a threaded means, is provided for adjusting the tension of the spring members 31 for regulating the relative movement of the oscillating shaft with respect to the ring member 25 during the oscillation of the cooperating sections 12 or 13, the purpose of which will be hereinafter understood.

In the present embodiment there is shown a pair of oscillating shafts 21 and a pair of oscillating shafts 21'; each of these shafts being connected to their respective eccentrics 19 and 20, and the connecting means 22 and 22', (see Figs. 2 and 6). The shaft 17 may be provided at each of its ends with pulleys 34, the latter being driven by any suitable means from any convenient power source.

Each of the sections 12 and 13 comprises a suitable framework, represented in its entirety by 35. Supported within the framework 35 are a plurality of angle iron members 36 positioned to support a plurality of removable horizontal grading trays, represented in their entirety by 37, (see Fig. 3). These grading trays are mounted in frames 35 in spaced horizontal relation, one above the other, and are clamped in rigid fixed relation with their cooperating supporting angle irons 36 by clamping means 38. This permits the trays 37 to be removed from the frame structure 35 by loosening the threaded means 39 of the clamping means 38.

Each of the grading trays 37 comprises a framework having side and end channel iron members 41, the flanges of the channel iron members extending inwardly of the trays and adapted to receive wooden members 42. Across the top of the trays 37 is provided a grading screen, which screen may comprise a plurality of metallic rods 43 disposed in parallel relation and extending longitudinally of the trays 37. The ends of the rods 43 are welded or otherwise fixed to the cooperating end channel irons 41, as shown at 44. A plurality of rods or metallic strips 45 are provided for maintaining the rods 43 in proper spaced relation. From Figs. 3 and 5 it will be noted that strips 45 are widely spaced relative to the spacing of rods 43 so that the grading screen is not a mesh, but the openings therethrough are elongated slots. These rods 45 are disposed laterally of the trays 37 at right angles to the rods 43, and are welded to the under side of rods 43 at their numerous intersections, as shown at 46. The rods 43 of the several screens are spaced apart in accordance with predetermined dimensions for grading the several sizes of the nuts included in the product being graded. In other words, the uppermost tray is provided with a grading screen wherein the rods 43 are spaced at a greater distance apart than the rods 43 of the top or grading screen of the tray next below. Each of the trays are provided with a plurality of spaced longitudinal members 47, and a plurality of spaced lateral members 48 for dividing the trays 37 into a plurality of compartments.

The trays 37 are also provided with a bottom screen 49. The bottom screen is of sufficient mesh to permit the nuts passing through the grading screen to fall freely therethrough onto the grading or top screen of the tray next below. Within the several compartments of the trays are disposed a plurality of rubber balls 50; these balls being greater in diameter than the mesh of the bottom screen, and are adapted to bounce against the lower side of the grading screens during the oscillation of the sections 12 and 13, for the purpose of preventing clogging of the nuts being graded on the next above grading screen. The bottom screens 49 may be fixed to the several trays by fastening their cooperating portions to the bottom of the wooden members 41 and bottom of members 47 and 48.

The section 12 is mounted at a slightly higher elevation than the section 13, and therefore it follows that the cooperating grading trays 37 of the sections 12 and 13 are likewise disposed at different elevations.

Flexible members 52 are provided for connecting the sides and bottom of the adjacent ends of the sections 12 and 13, also flexible means 53 are provided for connecting the upper or grading screen of the cooperating trays of the sections 12 and 13 for transferring the nuts being graded from section 12 to section 13. The supporting laminated spring members 14 cooperating with the spring means 22 of the oscillating shafts 21 and 21' operate to cause the nuts being graded to pass along over the grading screens 37. The nuts which are of such size as to pass between the respective grading screens fall through the spaced rods 43 onto the next below grading screen, while the nuts having dimensions greater than the distance between the grading rods 43 pass along over the top of the screens and are directed into cooperating chutes 55 where they are conveyed to a convenient destination for further inspection as to quality.

The respective spring means 31 of each of the sections 12 and 13 may be adjusted by the means 33 for decreasing or increasing the tension of the springs 31 for increasing or decreasing the throw of the screens 37 of the sections 12 and 13 respectively.

It can be seen from the above that the means 22 permits relative longitudinal movement of the shafts 21 and 21' with respect to the cooperating ring members 25 of the sections 12 and 13, and by increasing the tension on the springs 31 of the means 22, the relative movement of the oscillating shafts with respect to the cooperating spring members 25 will be decreased and consequently the throw of either section 12 or 13 may be adjusted to cause the nuts being graded to pass along over the grading screens 37 of the respective sections 12 and 13 at any predetermined speed. In other words, the nuts being graded by the section 12 may be caused to pass over the grading screens 37 of the section 12 more rapidly than the nuts passing over the grading screens of the section 13, by adjusting the means 33 for providing a lesser tension on the springs 31 of the means 22 associated with the section 12 than the tension of the means 22' associated with the section 13.

In the grading of large quantities of almonds and the like, considerable dust is created, which is very objectionable to the operators, and novel means are provided for collecting the dust and transferring it to a desired destination, which means consists of a suction blower, not shown, which serves to remove the dust created in the course of grading. The blower is connected by way of a passageway 60 to a hood 61, the latter being secured to the intake end of the grader and having a communication with the several grading screen surfaces, whereby air and dust from the screen surfaces are provided with a free entrance to the hood 61, where it is transferred by the blower for discharge into any suitable dust collector.

The operation of the device is as follows:—The nuts to be graded are fed to the upper grading screen at the left end of the section 12 by means of a chute 58. The sections 12 and 13 are oscillated in opposite directions by way of the eccentrics 19 and 20, and their cooperating shafts 21 and 21' respectively. The supporting spring members 14 and cooperating spring actuated means 22 and 22' operate to absorb the shock of momentum of sections 12 and 13 at the end of the stroke or throw, the throw or stroke causing the nuts to pass along over the grading screens during which time the nuts pass from one screen to the other according to size and are finally delivered to the cooperating chutes 55, as above described.

While I have illustrated and described one embodiment of the invention, it is to be expressly understood that certain changes, modifications, substitutions, additions, and omissions may be made in the structure without departing from the spirit and scope of the invention, as defined by the appended claims.

I claim:—

1. An apparatus for grading nuts, comprising a supporting structure, a plurality of adjacently spaced grading sections in end-to-end relation and each comprising a frame and a casing and a plurality of superposed trays overlying the same plane, each of said trays including a screen consisting of longitudinal bars free of laterally transverse obstruction at their upper surface, the casings being open at their respective ends which are adjacent the end of the other section, a flexible member connecting the open ends of said sections and closing the space therebetween for combining said sections into a continuous chamber, the trays of the adjacent sections being at complemental levels and having a flexible floor connection between the screens at complemental levels in the respective sections, a first resilient means for reciprocably supporting said sections on said structure, means for oppositely simultaneously oscillating said sections longitudinally, the last said means including a resilient means for cooperating with the first said resilient means for causing an oscillatory throwing action in relatively opposite directions longitudinally of said sections.

2. An apparatus for grading nuts, comprising a supporting structure, a pair of horizontal adjacently spaced grading sections resiliently supported on said structure, in end-to-end relation, each of said sections including a casing enclosed except at the adjacent ends and communicating thereat, a flexible member connecting the adjacent ends of the respective sections so as to close the opening of the space therebetween, a plurality of superposed horizontal removably mounted grading trays in each casing and overlying the same plane, said trays having a screen at top and at bottom thereof and also having means for vibrating the screens when the sections are oscillated, means for oscillating each of said sections simultaneously in relatively opposite directions, the said means including a single rotatable shaft laterally transversely centrally of the ends of the supporting structure and having diametrically oppositely disposed eccentrics thereon, a shaft longitudinal of each section and connecting each eccentric to the opposite end portion of the respective sections, and means longitudinally resilient and transversely pivotal for connecting the respective longitudinal shafts to the said opposite ends of the sections.

3. An apparatus for grading nuts, including a supporting structure, a pair of horizontal adjacently spaced end-to-end grading sections reciprocably mounted resiliently on said supporting structure, each section having an enclosing casing open at the relatively adjacent ends of the respective sections, a flexible connection joining the said adjacent ends and closing the opening of the space therebetween, whereby the pair of sections are combined into a continuous elongated chamber, said combined chamber having a feed device at one end and a plurality of outlets at the opposite end, a plurality of vertically spaced trays in the casings overlying the same plane and each screened at top and bottom, the upper of said screens comprising a plurality of longitudinal bars relatively spaced transversely of the trays, said bars being free of obstruction at their upper surface and connected at their lower surface by other bars disposed transversely of the longitudinal bars and widely spaced relative to the spacing of the longitudinal bars, the bottom screen of the tray being divided into compartments, means for simultaneously oscillating each of said sections in relatively opposite directions including a rotatable shaft having diametrically oppositely disposed eccentrics thereon, a separate shaft for connecting the said eccentrics with the respective sections, each of said shafts having longitudinally resilient and transversely pivotal connection to the respective sections, and loose objects in said tray compartments adapted to be thrown about upon reciprocation of the sections, the said adjacent grading sections each having its respective trays at levels complemental to the level of the trays of the other grading section and the upper screens of said complemental trays having a flexible connection forming a continuous floor between said upper screens of complemental trays of the respective sections, and the said combined chamber having an outlet connection for a blower device for removing dust from the interior of the combined chamber.

DAVID R. BAILEY.